(12) United States Patent
Farquhar

(10) Patent No.: US 9,574,413 B1
(45) Date of Patent: Feb. 21, 2017

(54) PORTABLE DRILL CUTTINGS SOLIDIFICATION SYSTEM AND METHOD

(71) Applicant: Michael Charles Farquhar, Broussard, LA (US)

(72) Inventor: Michael Charles Farquhar, Broussard, LA (US)

( * ) Notice: Subject to any disclaimer, the term of this patent is extended or adjusted under 35 U.S.C. 154(b) by 480 days.

(21) Appl. No.: 14/132,759

(22) Filed: Dec. 18, 2013

Related U.S. Application Data

(60) Provisional application No. 61/739,065, filed on Dec. 19, 2012.

(51) Int. Cl.
*E21B 21/06* (2006.01)
*C02F 11/00* (2006.01)
*E21B 41/00* (2006.01)
*B04B 15/12* (2006.01)

(52) U.S. Cl.
CPC .......... *E21B 21/066* (2013.01); *C02F 11/008* (2013.01); *E21B 41/005* (2013.01); *B04B 15/12* (2013.01)

(58) Field of Classification Search
CPC ...... E21B 21/066; E21B 21/065; E21B 21/01; E21B 21/002; E21B 21/02; E21B 21/06; E21B 21/063; E21B 2021/007; E21B 41/005; C02F 11/008; C02F 11/12; C02F 11/127; C02F 11/14
USPC ... 34/357, 580, 591; 166/293, 267; 175/206, 175/207, 66; 209/3; 210/360.1, 390.1, 210/170.01, 752, 749; 405/129.3, 405/263, 266, 129.2, 129.25, 129.55; 494/43
See application file for complete search history.

(56) References Cited

U.S. PATENT DOCUMENTS

| | | | | |
|---|---|---|---|---|
| 5,028,010 A * | 7/1991 | Sansing | .................. | B01F 13/10 241/101.6 |
| 5,419,839 A * | 5/1995 | Haley | ..................... | C02F 11/14 210/752 |
| 6,585,115 B1 * | 7/2003 | Reddoch | ............... | E21B 21/066 175/206 |
| 2011/0120730 A1 * | 5/2011 | Clasen | .................. | E21B 19/165 166/381 |

FOREIGN PATENT DOCUMENTS

WO       WO 9108845 A2 * 6/1991 ............. B01F 13/10

* cited by examiner

*Primary Examiner* — Charles Cooley
*Assistant Examiner* — Shuyi S Liu
(74) *Attorney, Agent, or Firm* — Jones Walker LLP

(57) ABSTRACT

A drill cuttings solidification system includes a cuttings tank for storage of a drill cuttings material, an additive tank for storage of a solidification material, and a solidification chamber. The cuttings tank and the additive tank are operatively connected to a portable unit. The cuttings tank includes a cuttings auger assembly for conveyance of the drill cuttings material to a cuttings outlet. The additive tank includes an additive auger assembly for conveyance of the solidification material to an additive outlet. The solidification chamber includes a housing enclosing the cuttings outlet and the additive outlet, and an impeller for mixing drill cuttings material transferred through the cuttings outlet and solidification material transferred through the additive outlet. The system further includes a discharge assembly extending from the solidification chamber to a discharge outlet. The discharge assembly is configured to rotate and vertically pivot a discharge conduit relative to the portable unit.

19 Claims, 19 Drawing Sheets

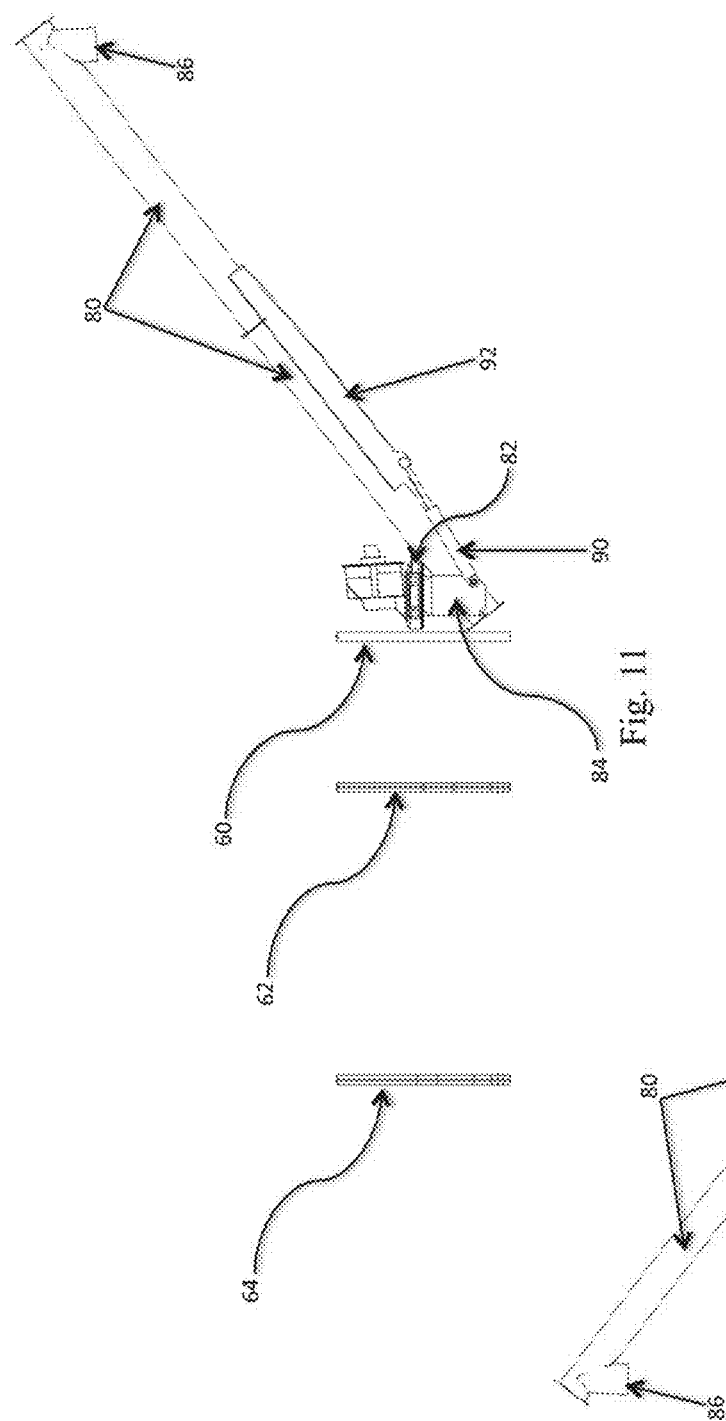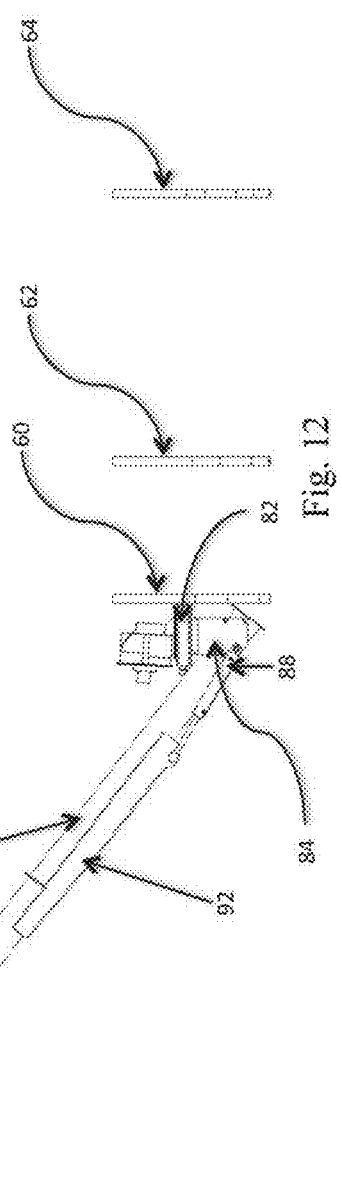
Fig. 11
Fig. 12

PORTABLE DRILL CUTTINGS SOLIDIFICATION SYSTEM AND METHOD

CROSS-REFERENCE TO RELATED APPLICATION

This application claims the benefit of and priority to U.S. Provisional Patent Application No. 61/739,065, filed on Dec. 19, 2012, which is incorporated herein by reference.

BACKGROUND

Drill cuttings are produced in the process of drilling oil and gas wells. Drilling mud is circulated in the wellbore and carries drill cuttings produced by the drill bit from the bottom of the well to the well surface. The drilling mud with the drill cuttings are transferred to sieving devices (also known as shakers). The shakers separate the drill cuttings from the drilling mud. The drilling mud recovered from the shakers is then re-circulated to the well. The drill cuttings removed by the shaker may be delivered to other treatment devices such as a centrifugal dryer for further removal of drilling mud. The drill cuttings are then collected in tanks for temporary storage until further treatment or management.

The drill cuttings collected in tanks may be contaminated by residual drilling mud or other wellbore contaminants such as salts, hydrocarbons, and heavy metals. In order to reduce the volume of drill cuttings and make the drill cuttings more suitable for disposal, the drill cuttings may be treated by secondary separation (e.g., centrifugal cuttings dryers or drying shakers) or a solidification process. Solidification techniques stabilize, compact, or otherwise mechanically bind the drill cuttings into larger monolithic solids. Cement, fly ash, lime, and calcium oxide are often mixed with drill cuttings as additives in the solidification process. The surface area of drill cuttings is greatly decreased by the solidification process, resulting in reduced leaching of contaminants from the solidified drill cuttings.

BRIEF DESCRIPTION OF THE SEVERAL VIEWS OF THE DRAWINGS

FIG. 11 is a right side view of the discharge conduit and series of gussets, with the discharge conduit in the extended position.

FIG. 12 is a left side view of the discharge conduit and series of gussets, with the discharge conduit in the extended position.

DETAILED DESCRIPTION OF SELECTED EMBODIMENTS

Figure 1:
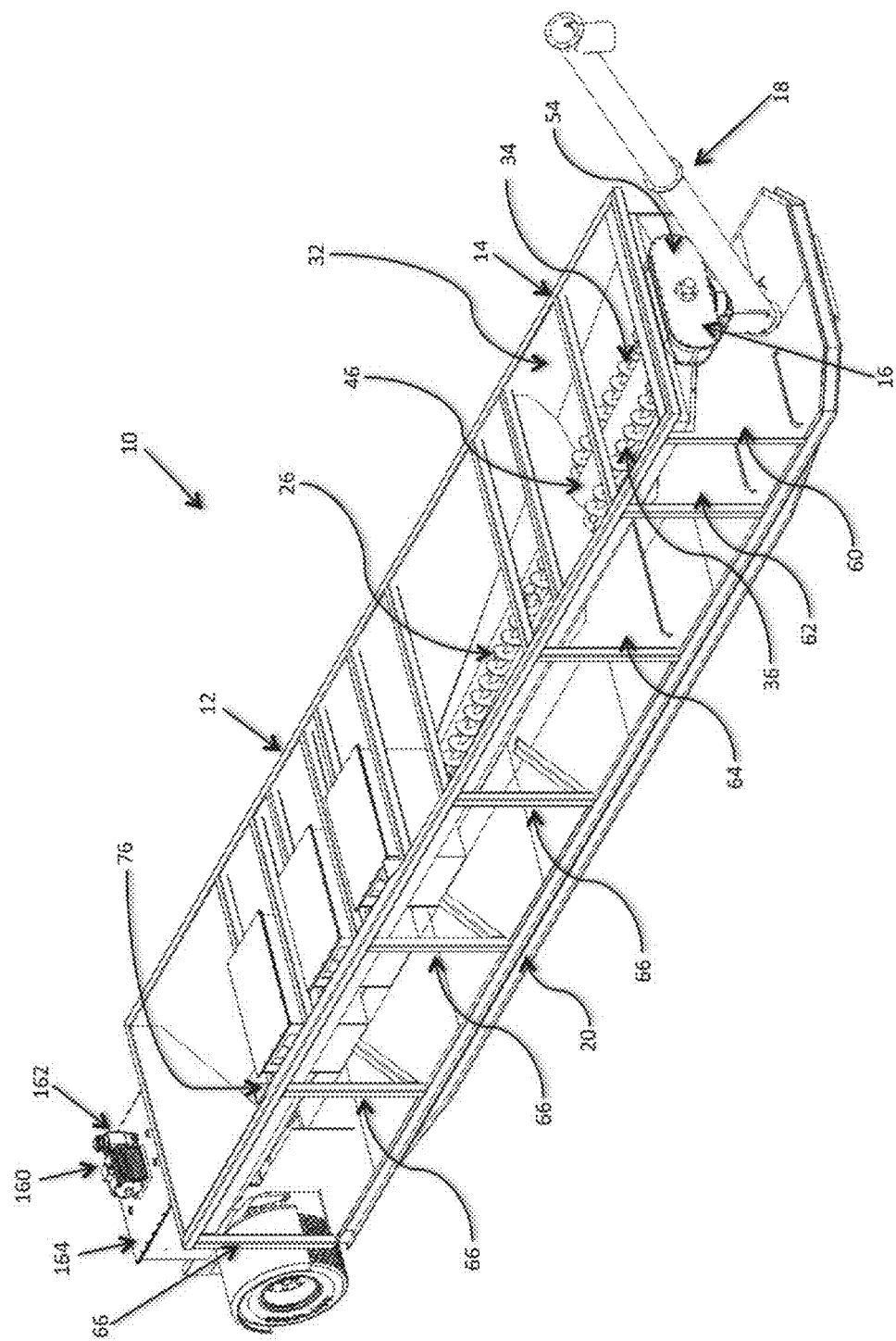
FIG. 1 is a front perspective view of a portable drill cuttings solidification system.
Figure 2:
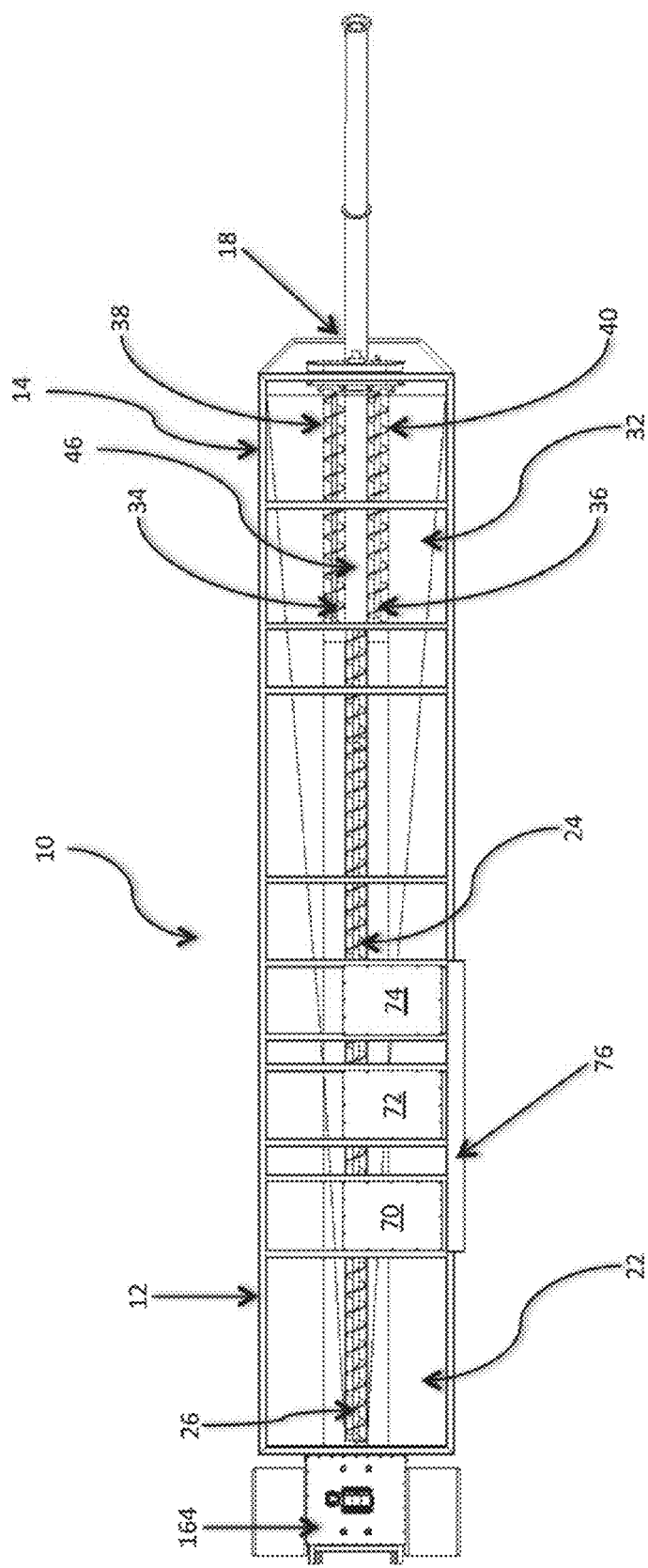
FIG. 2 is a top view of the solidification system.
Figure 3:
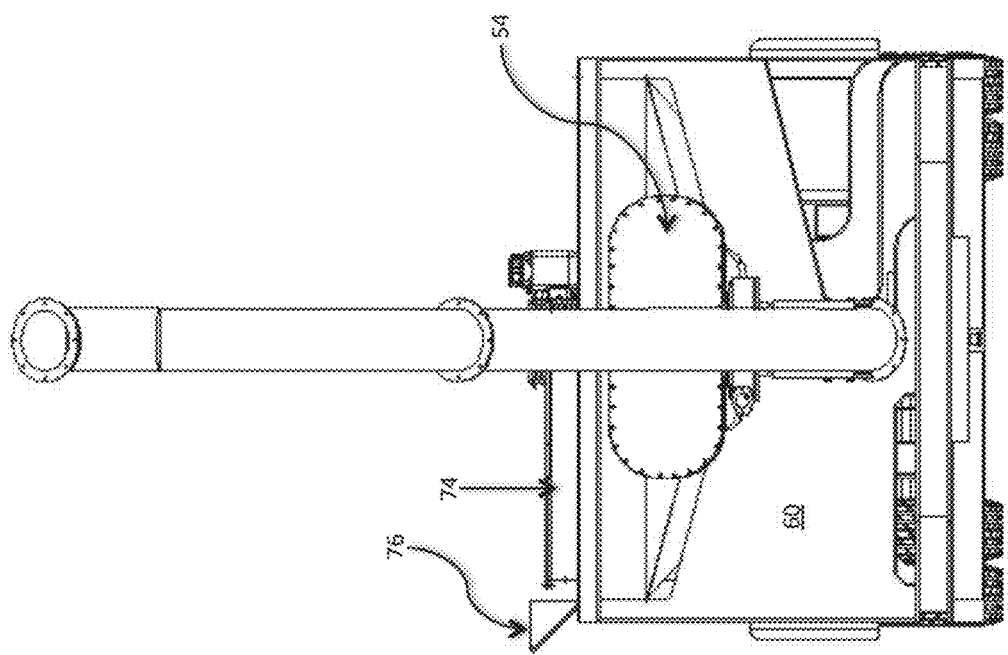
FIG. 3 is a front end view of the solidification system.
Figure 4:
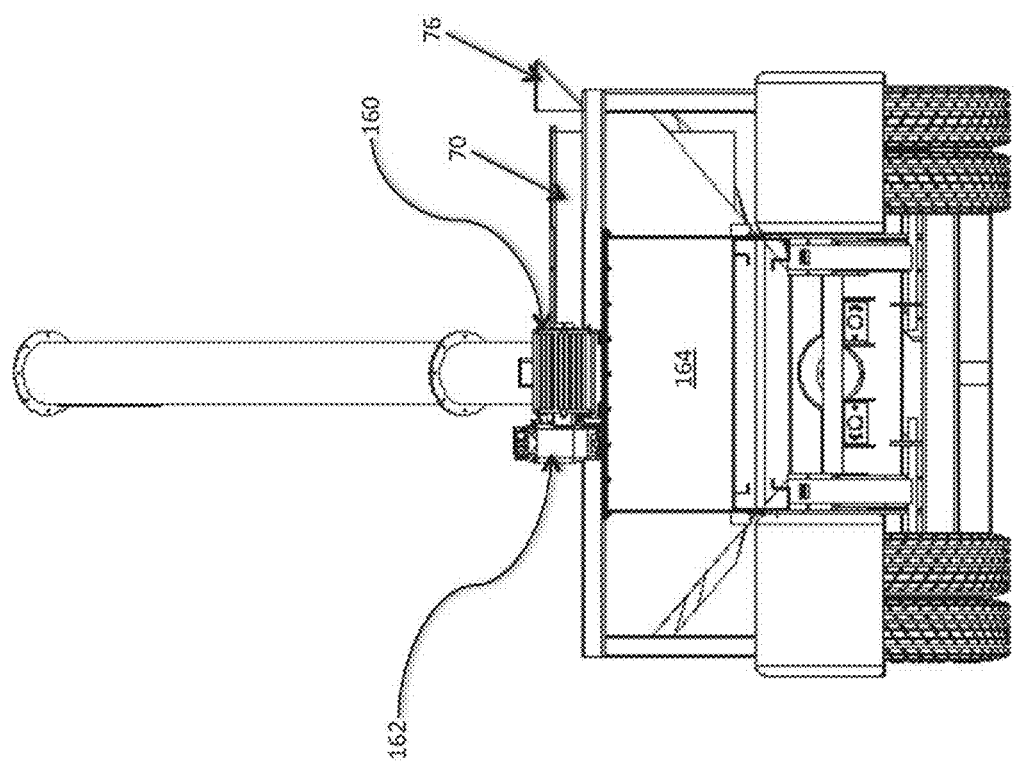
FIG. 4 is a rear end view of the solidification system.
Figure 5:
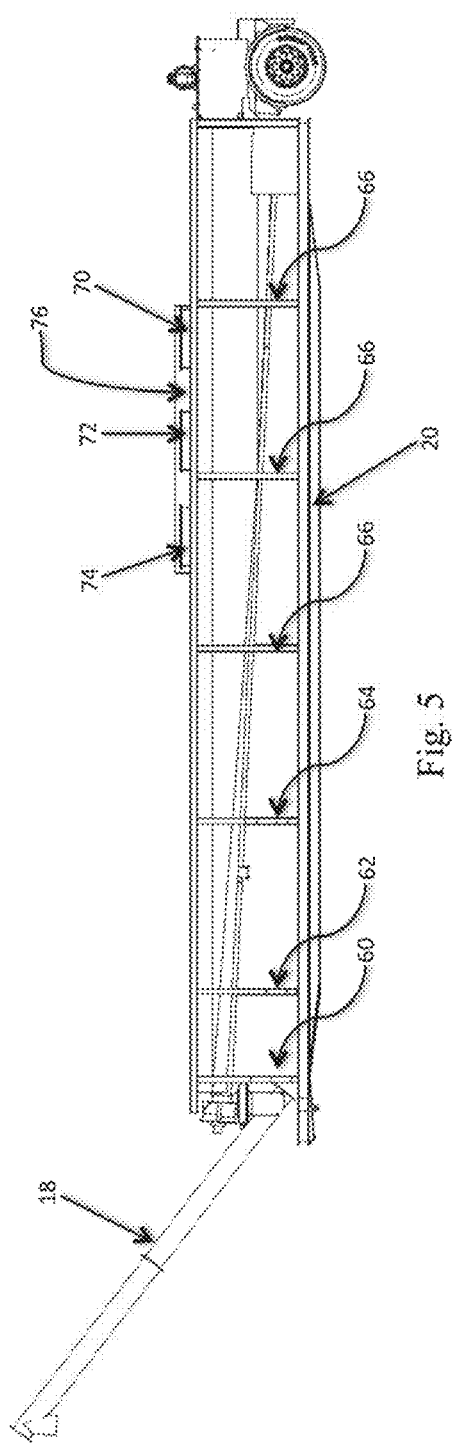
FIG. 5 is a left side view of the solidification system.
Figure 6:
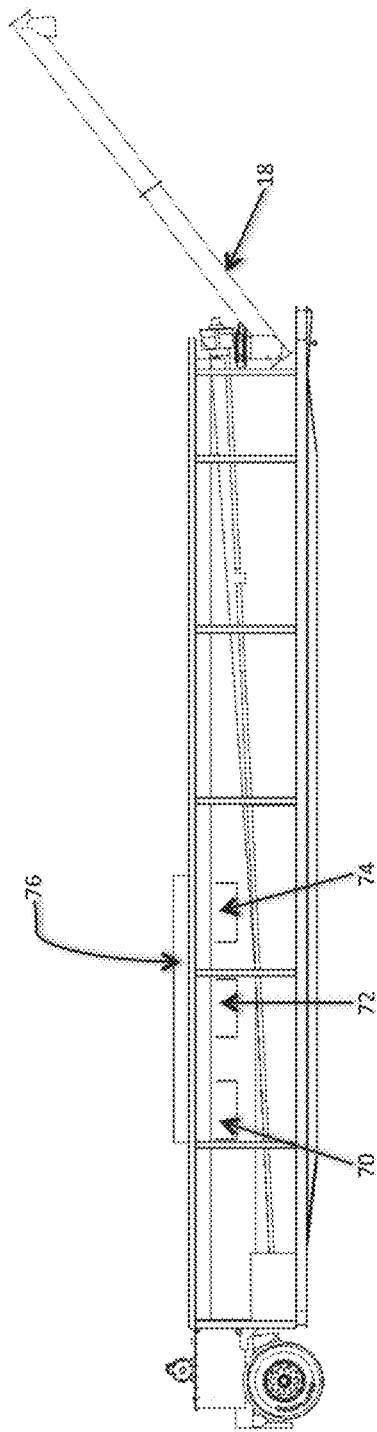
FIG. 6 is a right side view of the solidification system.
Figure 7:
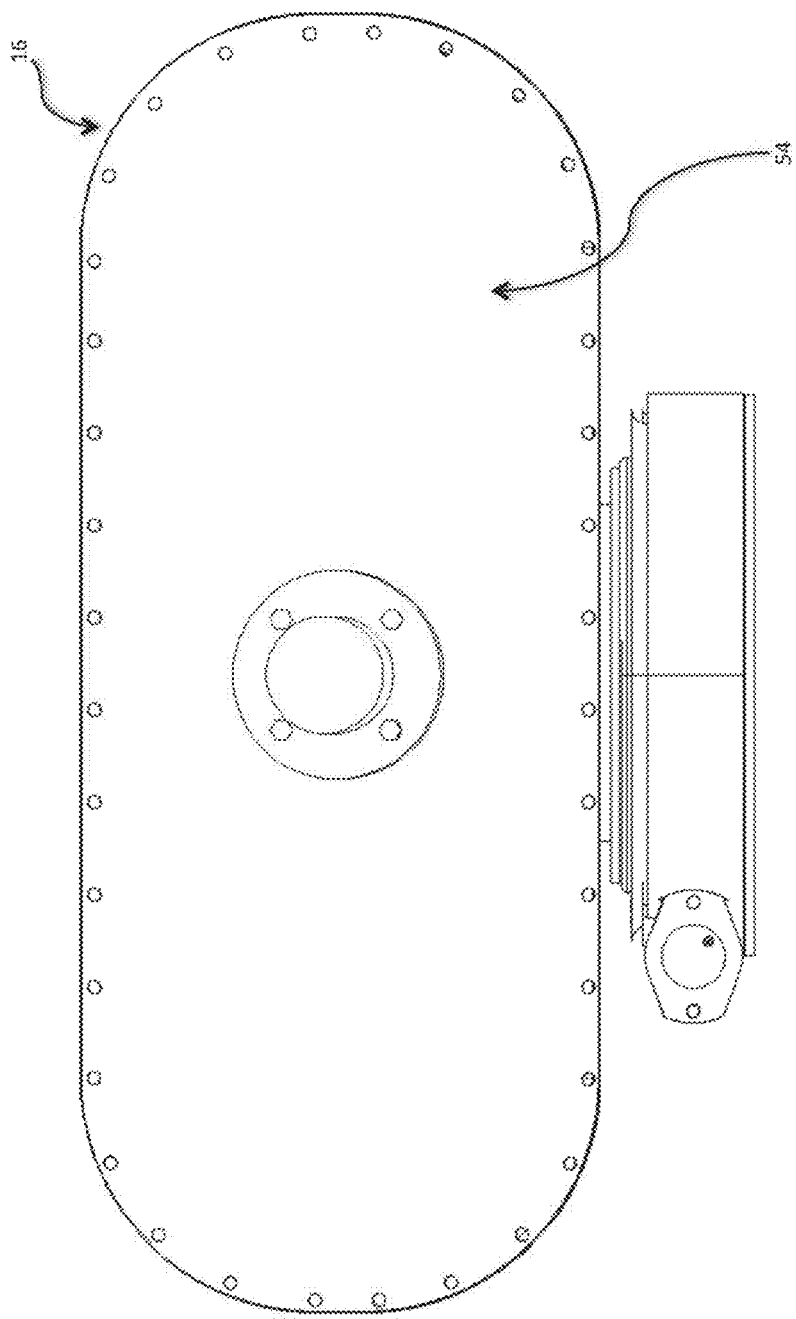
FIG. 7 is a front detail view of a solidification chamber of the solidification system.

With reference to FIGS. 1-6, drill cuttings solidification system 10 may include cuttings tank 12, additive tank 14, solidification chamber 16, and discharge assembly 18. Solidification system 10 may be disposed on portable unit 20. Portable unit 20 may include a trailer chassis designed to be pulled with a truck or tractor. For example, portable unit 20 may include a wheel and axle assembly as shown in FIGS. 1-6.

Cuttings tank 12 and additive tank 14 may be adjacent to one another as shown. Cuttings tank 12 may include walls 22 and cuttings auger trough 24 positioned at the base of cuttings tank 12. Cuttings tank 12 may have a downwardly sloped bottom leading to cuttings auger trough 24. Cuttings auger assembly 26 may be disposed within cuttings auger trough 24. Cuttings tank 12 may further include a cover formed of grating. In one embodiment, the grating cover includes one or more doors.

With reference now to FIGS. 1-8, additive tank 14 may include walls 32 and additive auger assemblies 34 and 36 disposed within additive auger troughs 38 and 40, which may be positioned at the base of additive tank 14. Additive tank 14 may have a downwardly sloped bottom leading to additive auger troughs 38, 40. Additive auger troughs 38, 40 and additive auger assemblies 34, 36 may extend to additive outlets 42 and 44 (shown in FIG. 8) in solidification chamber 16.

Figure 8:
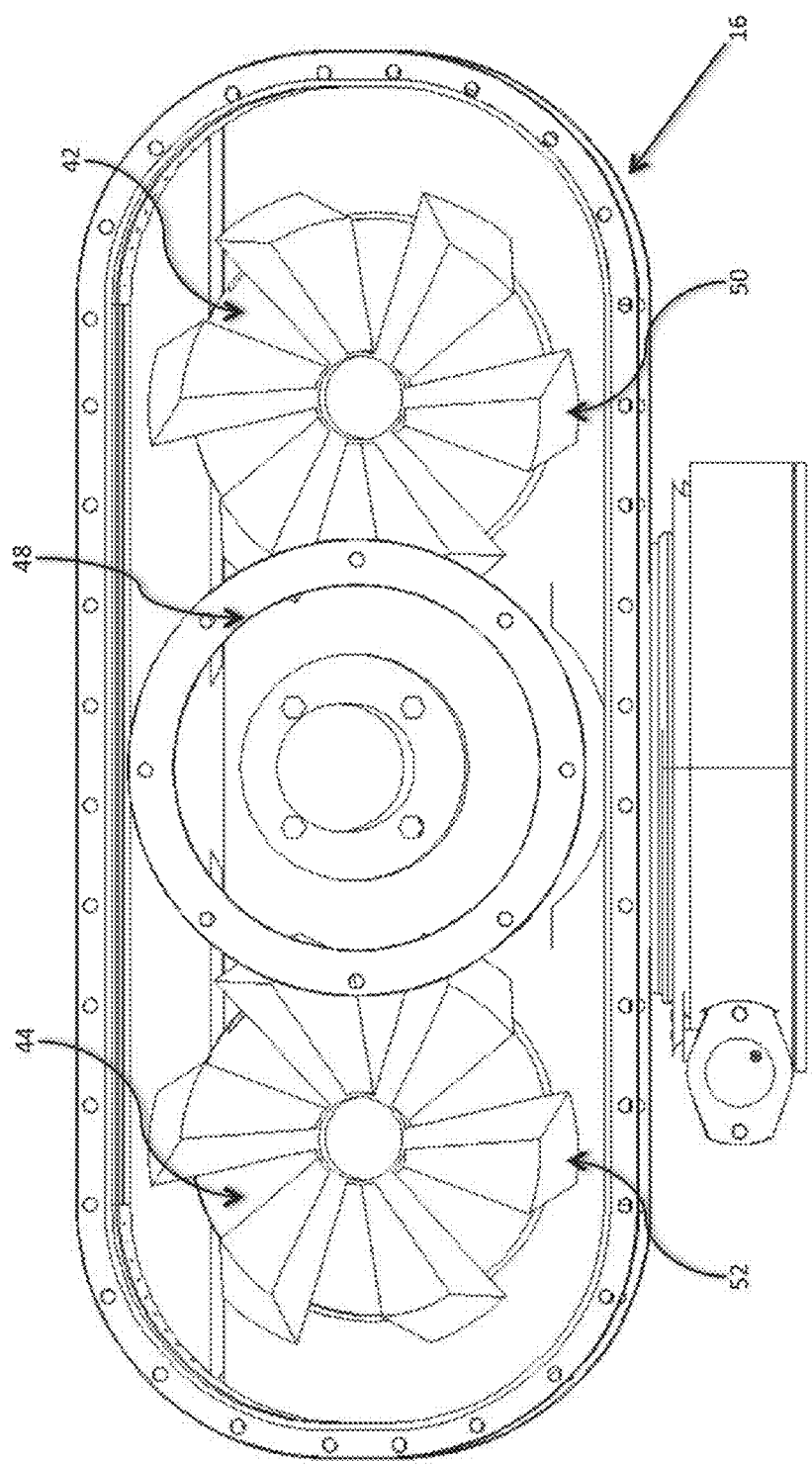
FIG. 8 is a front internal detail view of the solidification chamber of FIG. 7.
Figure 9:
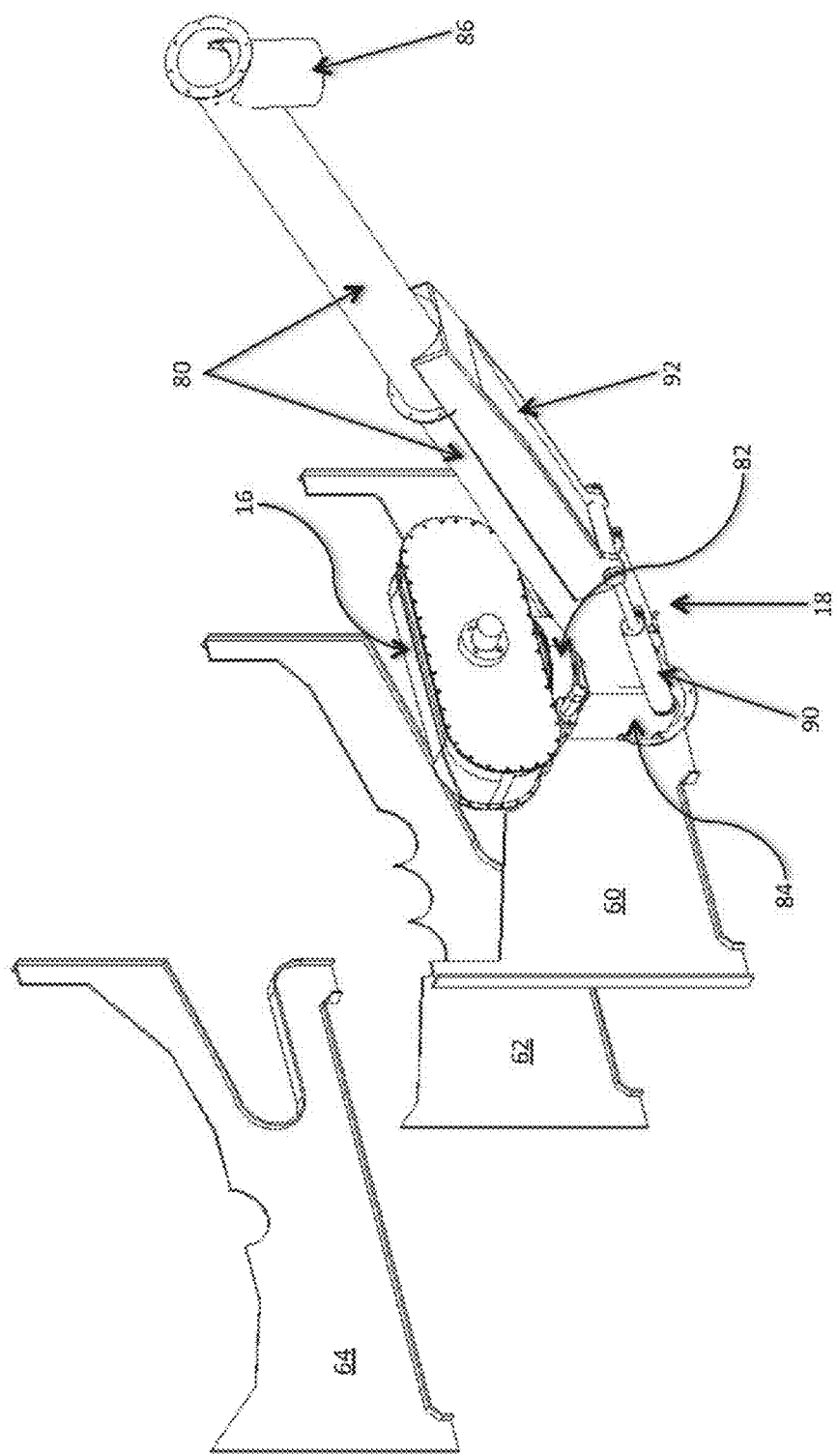
FIG. 9 is a front perspective view of a discharge conduit and series of gussets of the solidification system, with the discharge conduit in an extended position.
Figure 10:
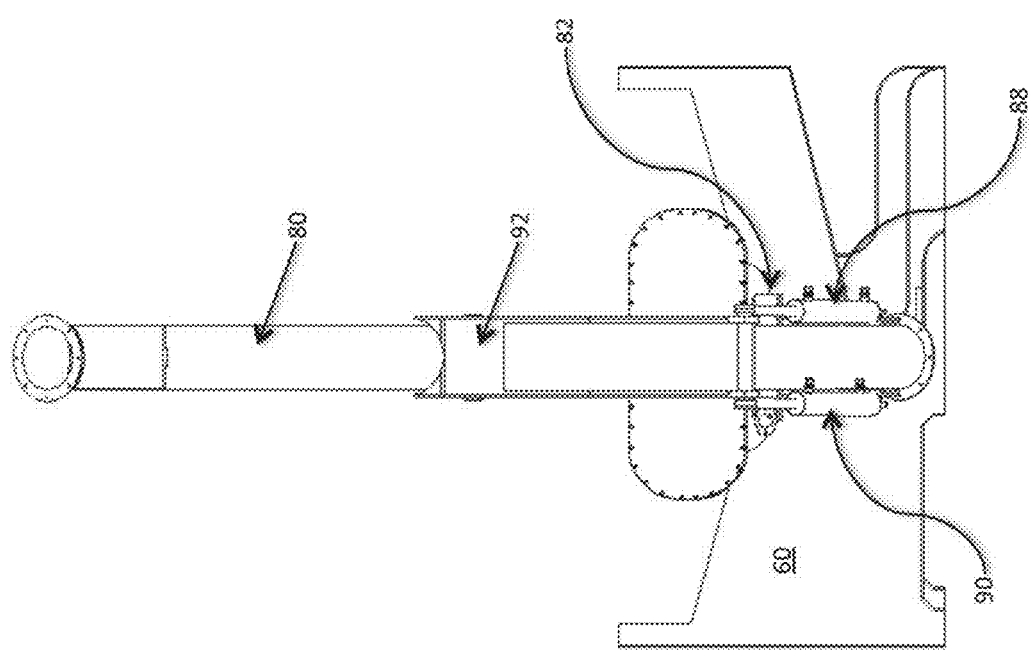
FIG. 10 is a front end view of the discharge conduit and series of gussets, with the discharge conduit in the extended position.
Figure 13:
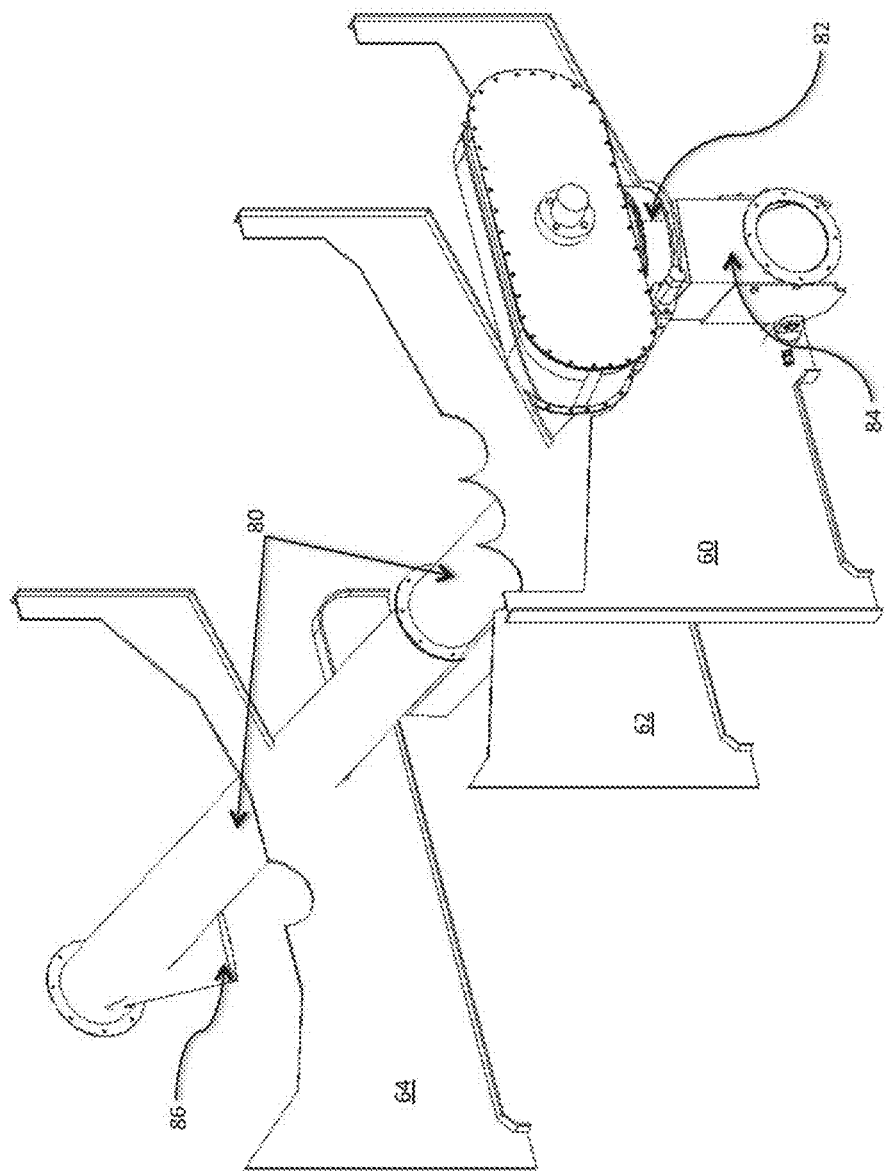
FIG. 13 is a front perspective view of the discharge conduit and series of gussets of the solidification system, with the discharge conduit in a retracted position.
Figure 14:
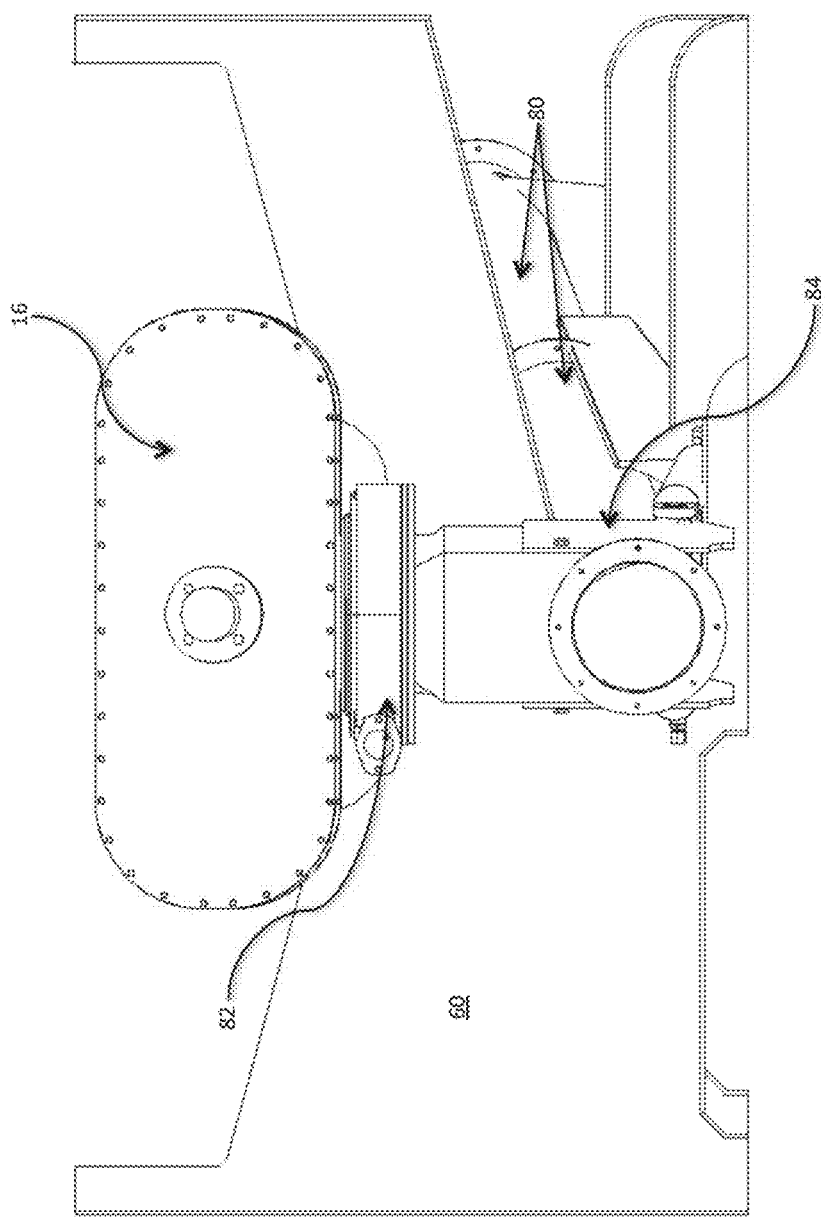
FIG. 14 is a front end view of the discharge conduit and series of gussets, with the discharge conduit in the retracted position.
Figure 15:
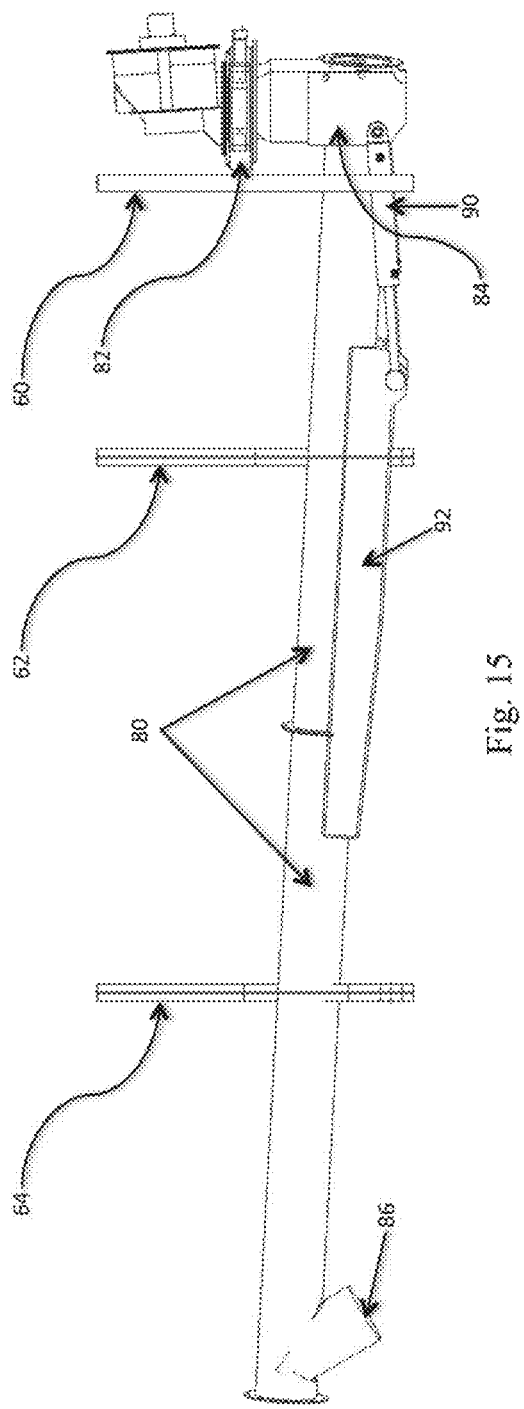
FIG. 15 is a right side view of the discharge conduit and series of gussets, with the discharge conduit in the retracted position.
Figure 16:
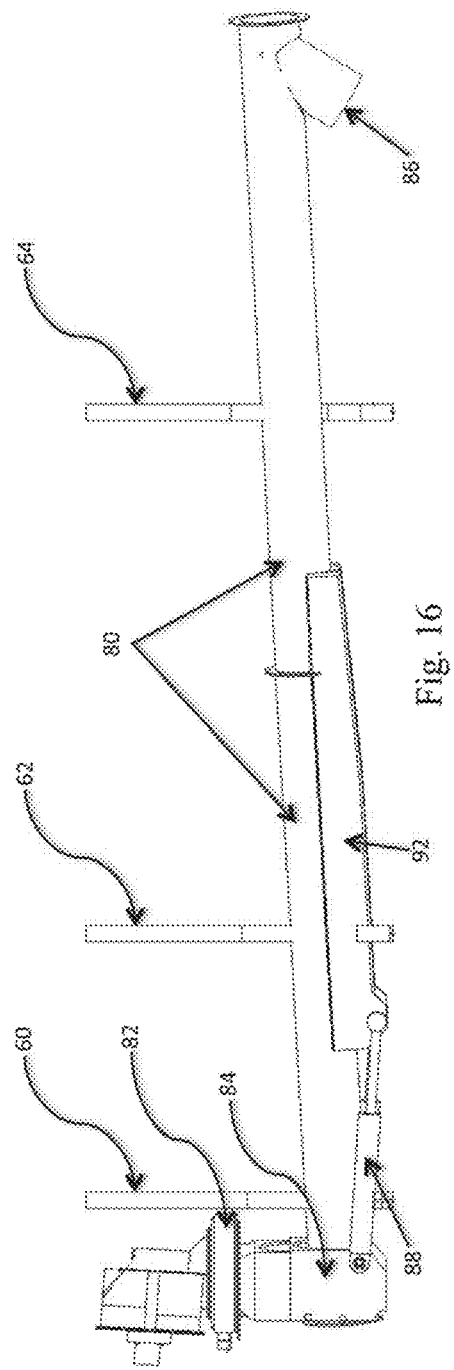
FIG. 16 is a left side view of the discharge conduit and series of gussets, with the discharge conduit in the retracted position.

Cuttings auger conduit 46 may be disposed at the base of additive tank 14, and may lead from cuttings tank 12 to cuttings outlet 48 in solidification chamber 16. Cuttings auger assembly 26 may extend through cuttings auger conduit 46 in the form of a tunnel. As shown in FIG. 8, cuttings outlet 48 may be positioned behind the bearing at the end of cuttings auger assembly 26. Impellers 50 and 52 may be disposed at additive outlets 42 and 44 within solidification chamber 16. Solidification chamber 16 may include housing 54 (also referred to as a cover) enclosing cuttings outlet 48, additive outlets 42, 44, and impellers 50, 52. Solidification chamber 16 may further include a port or outlet at its base.

Referring again to FIGS. 1-6, cuttings tank 12 and additive tank 14 may be supported on portable unit 20 by gussets 60, 62, and 64 and multiple beams 66. Solidification system 10 may further include dryers 70, 72, and 74 and slide 76. Solidification system 10 may include any suitable number of dryers. For example, solidification system 10 may include three dryers as shown in FIGS. 1-6. Dryers 70, 72, 74 may fit within or above cuttings tank 12. Slide 76 may be pivotally attached to cuttings tank 12, such that slide 76 may be folded for storage or transportation.

With reference now to FIGS. 9-16, discharge assembly 18 may include discharge conduit 80, slew gear 82, and pivot assembly 84. Discharge conduit 80 may be independently movable and may be articulated relative to the remainder of solidification system 10 and portable unit 20. Discharge conduit 80 may be rotated and vertically pivoted relative to portable unit 20 such that discharge outlet 86 is selectively positioned over different receptacles without moving solidification system 10 and portable unit 20. A discharge auger assembly may be disposed within discharge conduit 80. In one embodiment (as shown in FIGS. 9-16), slew gear 82 may be positioned between solidification chamber 16 and pivot assembly 84. Slew gear 82 may be used to rotate discharge conduit 80. Hydraulic arms 88 and 90 may be connected to pivot assembly 84 and support 92, which may be fixed to discharge conduit 80. Activation of hydraulic arms 88, 90 may pivotally raise discharge conduit 80, and deactivation of hydraulic arms 88, 90 may pivotally lower discharge conduit 80.

Figure 17:
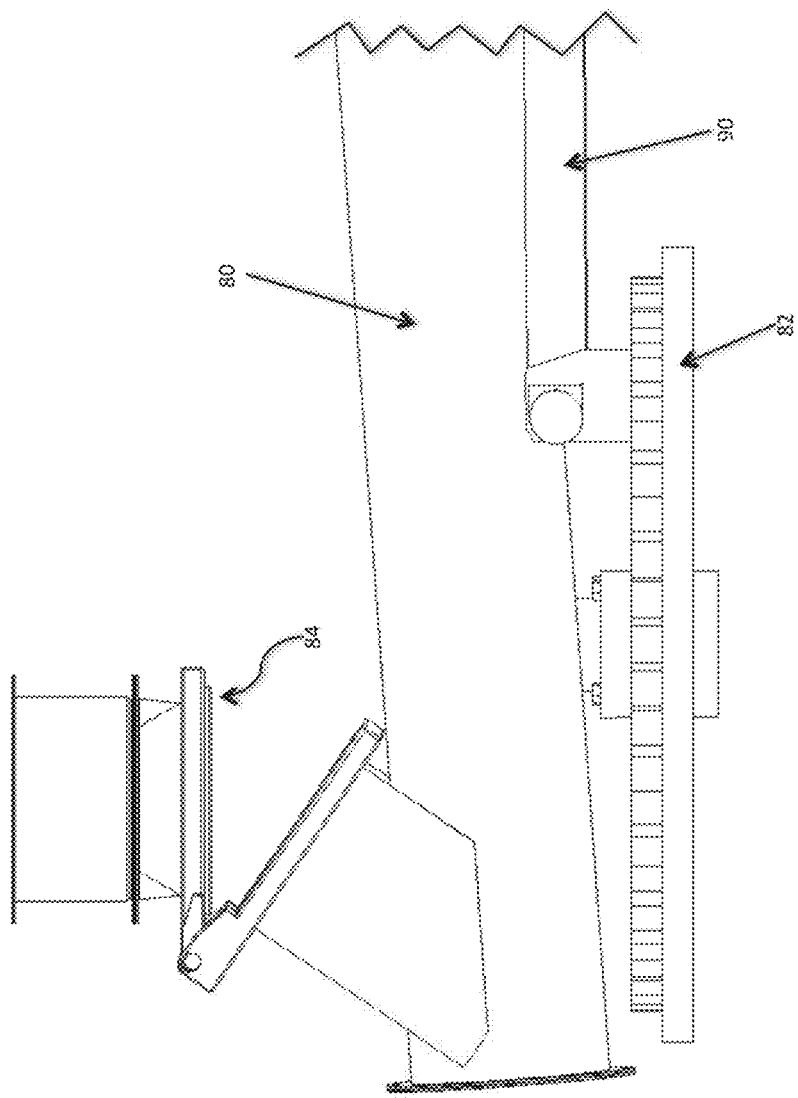
FIG. 17 is a side detail view of an alternate embodiment of a discharge assembly of the solidification system with the discharge conduit in the retracted position.
Figure 18:
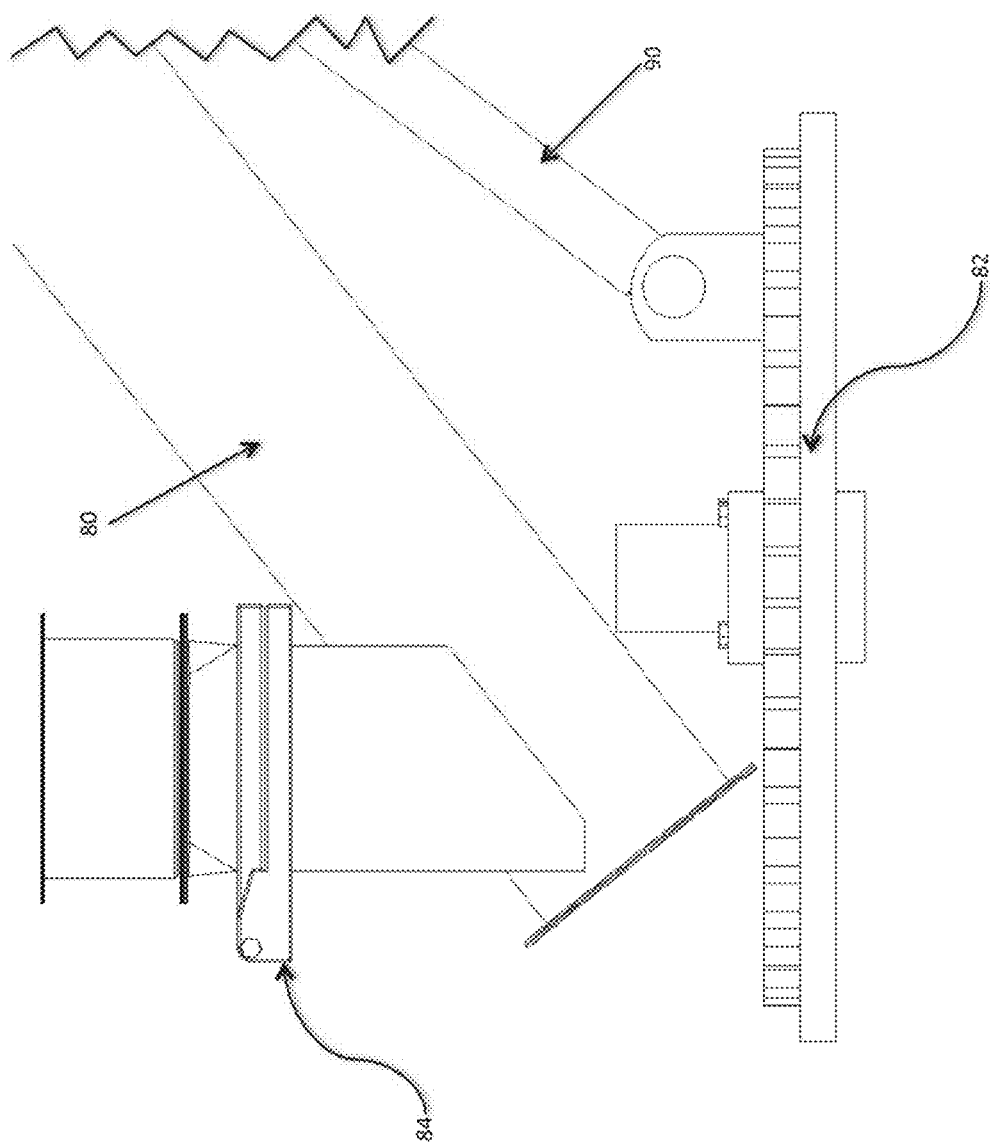
FIG. 18 is a side detail view of the discharge assembly of FIG. 17 with the discharge conduit in the extended position.

FIGS. 17 and 18 show an alternate embodiment of discharge assembly 18 in which slew gear 82 is positioned on portable unit 20 below pivot assembly 84, and hydraulic arms 88 and 90 are connected to slew gear 82 and support 92. In another alternate embodiment, slew gear 82 may be positioned as shown in FIGS. 9-16, and hydraulic arms 88, 90 may be connected to slew gear 82 and support 92. Any rotation mechanism known in the art may be used in place of slew gear 82 in order to provide for rotation of discharge conduit 80 relative to portable unit 20.

Figure 19:
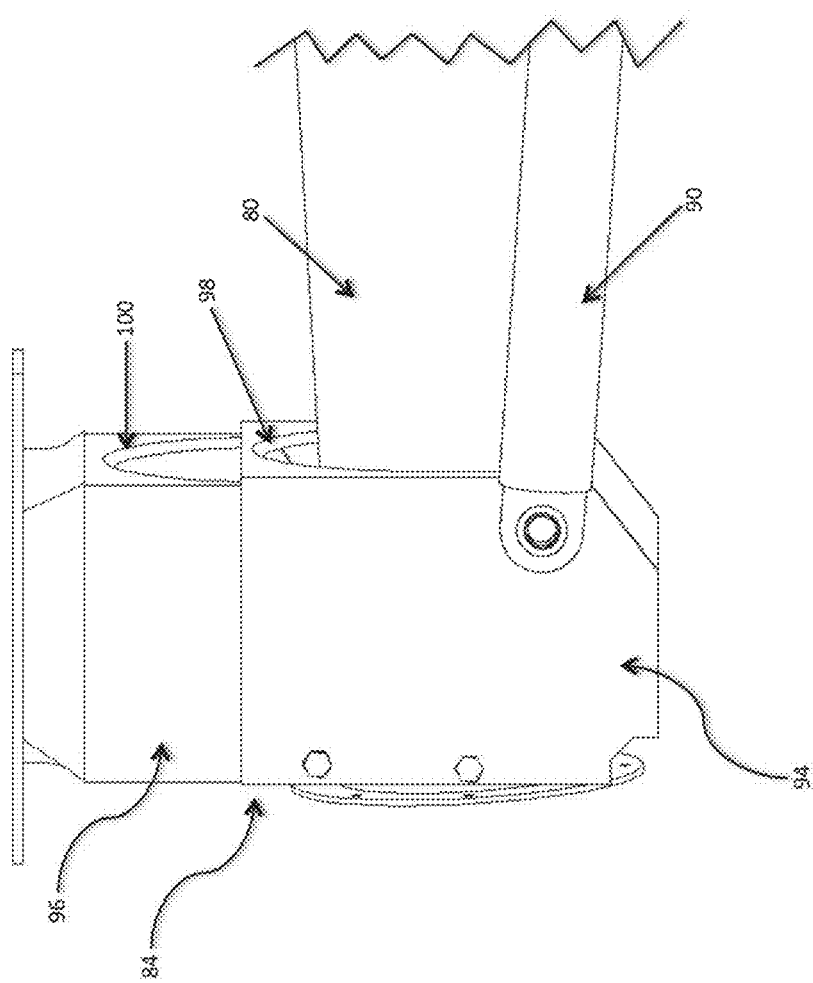
FIG. 19 is a side detail view of a pivot assembly shown in FIG. 1-16 with the discharge conduit in the retracted position.
Figure 20:
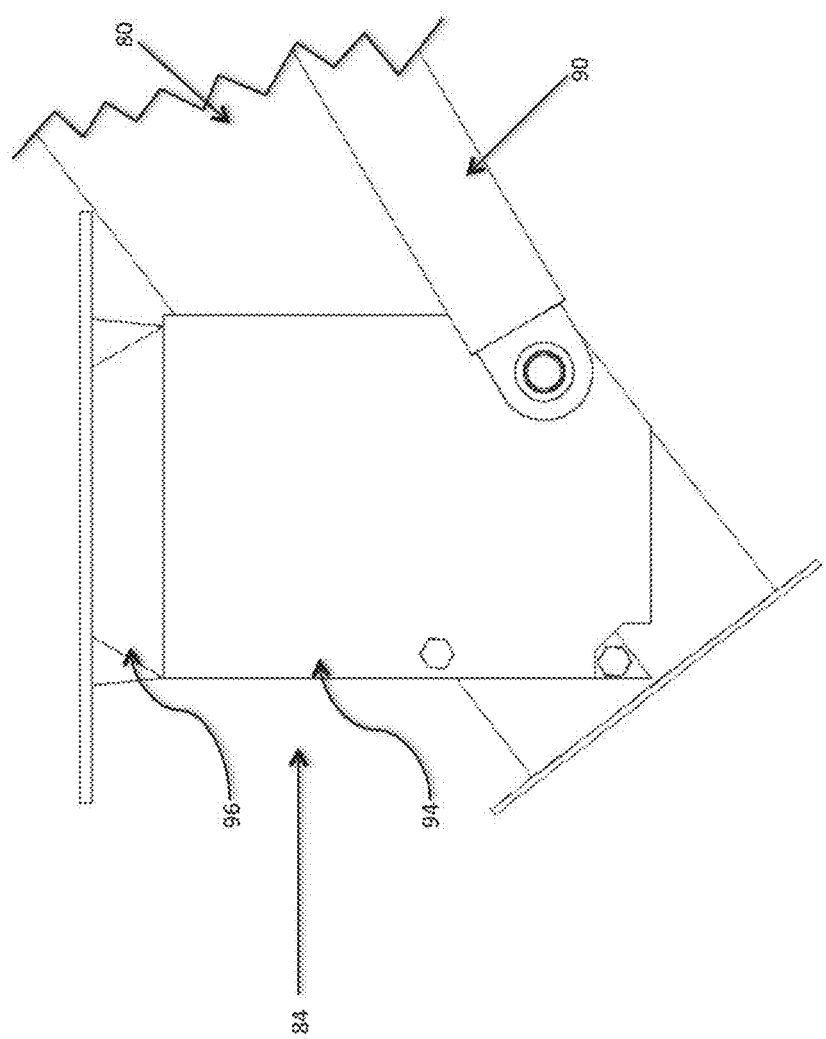
FIG. 20 is a side detail view of the pivot assembly of FIG. 19 with the discharge conduit in the extended position.

Discharge conduit 80 may be retractable. In this way, discharge conduit 80 may be stored for transportation on portable unit 20 without any disassembly of discharge assembly 18. FIGS. 9-12 show discharge conduit 80 in an extended position, while FIGS. 13-16 show discharge conduit 80 in a retracted position. Gussets 60, 62, and 64 may each include a recess to accommodate discharge conduit 80 in the retracted position. FIG. 19 shows pivot assembly 84 with discharge conduit 80 in the retracted position. FIG. 20 shows pivot assembly 84 with discharge conduit 80 in the extended position. In one embodiment, pivot assembly 84 may include outer shell 94 pivotally connected to hydraulic arm 90. Pivot assembly 84 may also include inner shell 96 cooperatively connected to outer shell 94, which may be slidingly disposed around inner shell 96. Discharge conduit 80 may be pivotally connected to inner shell 96. Outer shell 94 may include outer arch 98, and inner shell 96 may include inner arch 100. FIGS. 17 and 18 also illustrate an alternate embodiment of pivot assembly 84 comprising a hinged flange connection. In this alternate embodiment, the hinged flange connection is closed when discharge conduit 80 is in the extended position (FIG. 18), but open when discharge conduit 80 is in the retracted position (FIG. 17). Pivot assembly 84 shown in FIGS. 19 and 20 may remain closed with discharge conduit 80 in all positions.

With reference to FIGS. 1-16, solidification system 10 may also include electric motor 160 for powering hydraulic pump 162, which may supply hydraulic fluid for powering hydraulic arms 88, 90 as well as a hydraulic motor for each of dryers 70, 72, 74, a hydraulic motor for cuttings auger assembly 26, a hydraulic motor for each of additive auger assemblies 34, 36, a hydraulic motor for the discharge auger disposed within discharge conduit 80, and a hydraulic motor for slew gear 82. The hydraulic fluid supplied by hydraulic pump 162 may be stored in hydraulic tank 164. The flow of the hydraulic fluid may be controlled with a series of devices on a control panel. For example, the control panel may include an on/off switch for the hydraulic motors associated with each of dryers 70, 72, 74, cuttings auger assembly 26, each of additive auger assemblies 34, 36, the discharge auger, and slew gear 82. Additionally, the control panel may include a speed control for the hydraulic motors associated with each of dryers 70, 72, 74, cuttings auger assembly 26, each of additive auger assemblies 34, 36, and the discharge auger. The control panel may also include a joystick control for hydraulic arms 88, 90 and the hydraulic motor associated with slew gear 82. In this way, the joystick control may provide a simple method of controlling the rotation and vertical movement of discharge conduit 80. The control panel may be positioned on portable unit 20 with solidification system 10 for convenient access by an operator. Alternatively, each component of solidification system 10 may be electrically powered. For example, the auger assemblies may be driven by a 10 hp electric motor.

Figure 21:
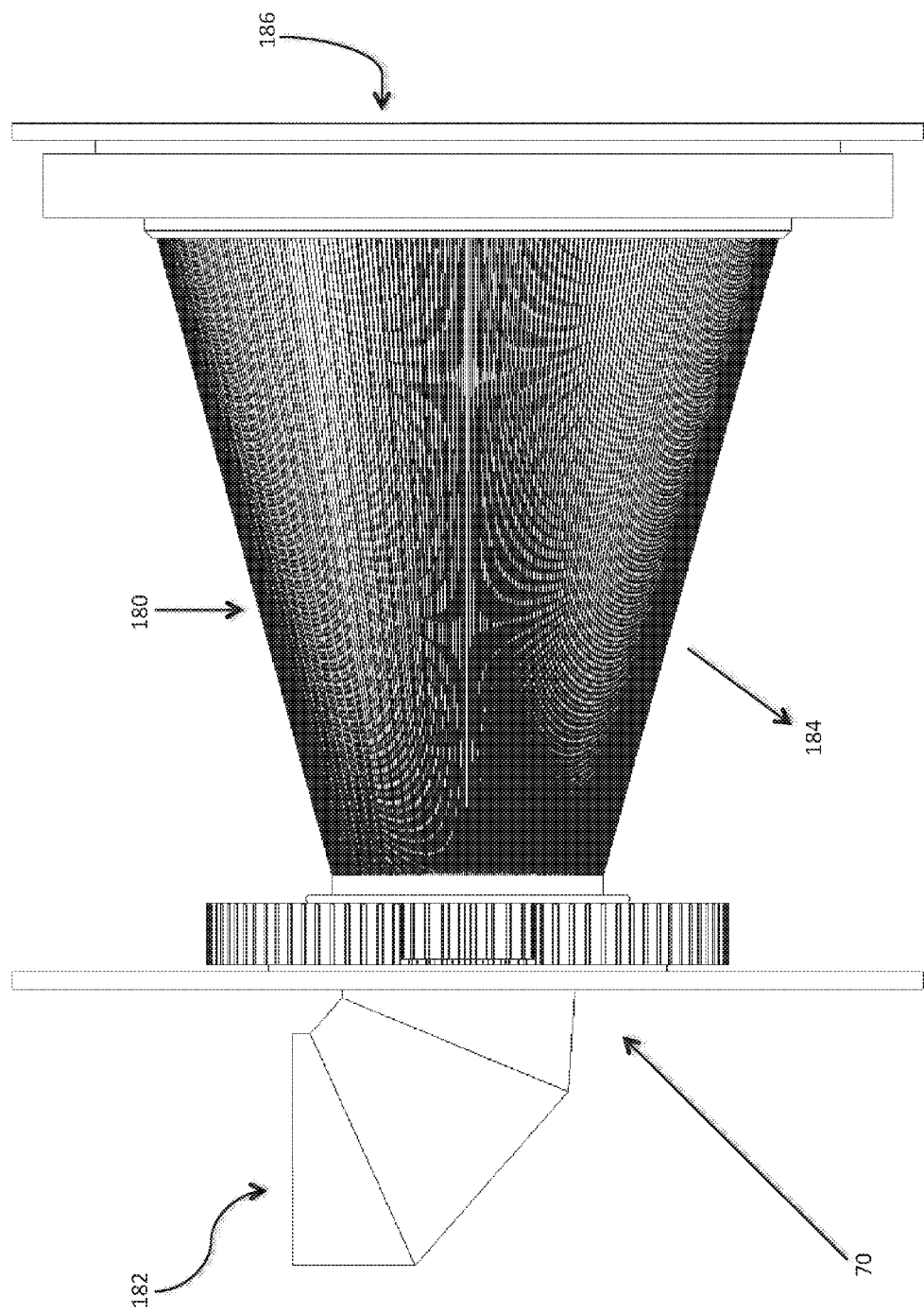
FIG. 21 is an internal side view of a dryer of the solidification system.
Figure 22:
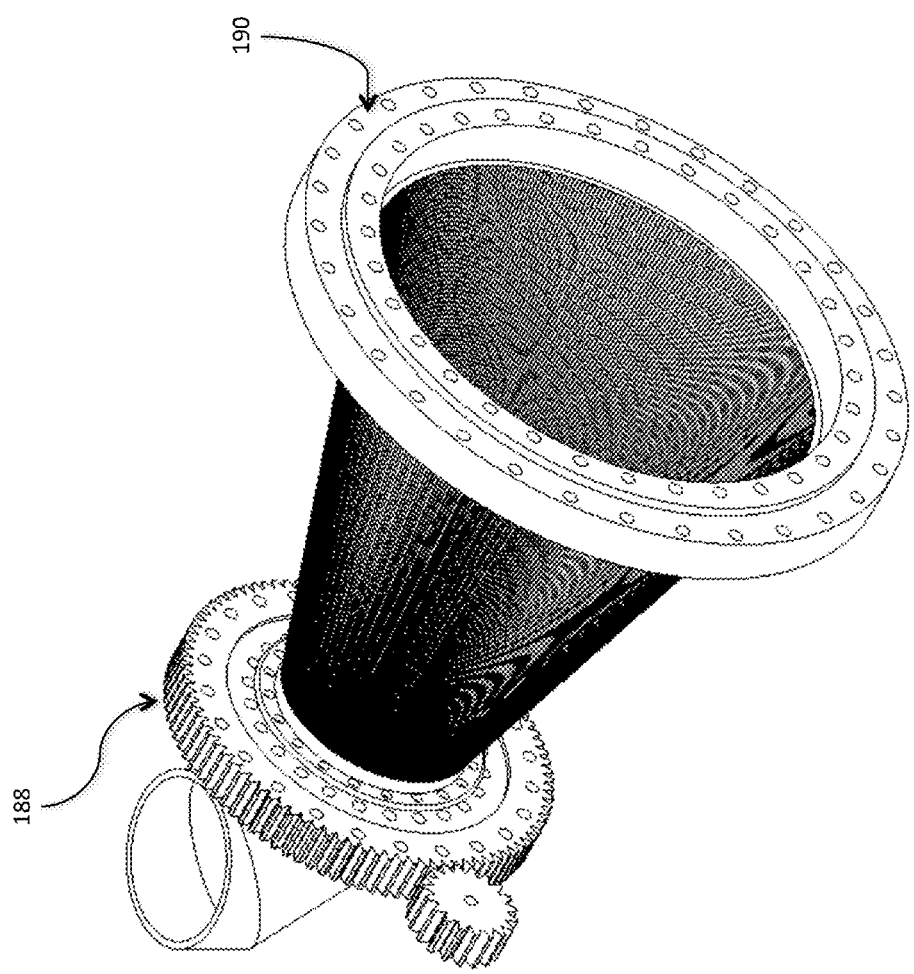
FIG. 22 is an internal perspective view of the dryer of FIG. 21.

FIGS. 21 and 22 illustrate dryer 70, which may include screen 180, inlet 182, effluent outlet 184, and dry outlet 186. In one embodiment, dryer 70 may have no scroll positioned within screen 180. Screen 180 may be rotated by slew drives 188 and 190. Dry outlet 186 may direct drill cuttings from dryer 70 into cuttings tank 12 through the grating cover or through an opening in the grating cover. Alternatively, dry outlet 186 may be positioned below the grating cover in cuttings tank 12. Each of dryers 72 and 74 may have an identical design to dryer 70.

Solidification system 10 on portable unit 20 may be transported to a drilling site with a tractor or truck. Alternatively, portable unit 20 may be adapted for transportation on a barge to an offshore drilling rig. For example, portable unit 20 may include pad eyes for lifting solidification system 10 with a crane. During transportation, discharge conduit 80 may be in the retracted position as shown in FIGS. 13-16. Solidification system 10 may be positioned at the desired location at the drilling site by any means, such as with a tractor or truck. In one embodiment, portable unit 20 may be equipped with sockets to allow for connection to a fork lift or other piece of machinery ordinarily located at a drilling site, as readily understood by one of skill in the art. After positioning solidification system 10, a power cord of solidification system 10 may be connected to a power source at the job location, including but not limited to a generator. Electric motor 160 may be started in order to power hydraulic pump 160. Hydraulic tank 164 may contain a supply of hydraulic fluid upon arrival at the drilling location. Alternatively, hydraulic tank 164 may be charged with hydraulic fluid at the drilling location.

The control panel may be used to activate the hydraulic motor associated with slew gear 82, which may be used to rotate discharge conduit 80 out of the recesses in gussets 60, 62, and 64. The control panel may also be used to activate hydraulic arms 88, 90 in order to pivot discharge conduit 80 in an upward direction. Slew gear 82 and hydraulic arms 88, 90 may be used to position discharge outlet 86 over a waste receptacle or other storage device. The waste receptacle may be a dump truck or any other storage container or waste receptacle. Alternatively, solidification system 10 may be used to separate drill cuttings from drilling mud with dryers 70, 72, and 74 and to store the drill cuttings in cuttings tank 12 with discharge conduit 80 in the retracted position for a period of time until a waste receptacle is selected and positioned near solidification system 10.

Slides leading away from shakers at the drilling site may be operatively connected to slide 76. The control panel may be used to activate the hydraulic motor associated with dryers 70, 72, and 74, thereby starting dryers 70, 72, and 74. Drilling mud and drill cuttings may be fed from the shakers to inlet 182 of dryers 70, 72, and 74 on slide 76. Dryers 70, 72, and 74 may be used to separate drilling mud from the mixture. Inlet 182 directs the drilling mud and drill cuttings into the smaller end of conically-shaped screen 180. As screen 180 is rotated by slew drives 188 and 190, the drilling mud passes through screen 180 leaving the drill cuttings on the inside of screen 180. The separated drilling mud exits dryers 70, 72, and 74 through effluent outlet 184 and may be circulated to a centrifuge device for further removal of drill cuttings from the drilling mud. As the drill cuttings travel to the larger end of conically-shaped screen 180, the drill cuttings may exit dryers 70, 72, and 74 through dry outlet 186, and may be fed directly into cuttings tank 12. The drill cuttings may be fed through the grating cover on cuttings tank 12, or the grating cover may have an opening to allow the drill cuttings to fall directly into cuttings tank 12. Alternatively, dry outlet 186 may be disposed below the grating cover. Additionally, the drill cuttings recovered with the centrifuge device may also be fed into cuttings tank 12, either through the grating cover or through openings or doors in the grating cover by front end loader or any other suitable manner known in the art. In an alternative embodiment, only one or two of dryers 70, 72, and 74 may be used, and slide 76 may be adjusted such that drill cuttings leaving the shakers are directed only into the operative dryers 70, 72, and 74.

The drill cuttings may be collected in cuttings tank 12. When discharge outlet 86 is positioned over a waste receptacle, cuttings auger assembly 26 and the discharge auger may be activated by activating the hydraulic motor for each device. The rotation of cuttings auger assembly 26 may convey the drill cuttings from cuttings tank 12 through cuttings auger conduit 46, through cuttings outlet 48, into separation chamber 16, through its port, and into discharge conduit 80, where the discharge auger may transfer the drill cuttings to discharge outlet 86 and into the waste receptacle positioned below. Impellers 50, 52 may be activated automatically when cuttings auger assembly 26 is activated. In one embodiment, impellers 50, 52 may each be positioned with a floating bearing on the shaft of each additive auger assembly 34 and 36, respectively. In this embodiment, a chain may drive impellers 50, 52 with the rotation of cuttings auger assembly 26.

The drill cuttings may be stored in cuttings tank 12 for a period of time before they are transferred to a waste receptacle in the manner described. As understood by one skilled in the art, the drill cuttings in cuttings tank 12 may be tested to determine whether additives must be mixed with the drill cuttings before disposal. If testing reveals that additives are necessary, additive auger assemblies 34, 36 may be activated along with cuttings auger assembly 26 and the discharge auger. Additive auger assemblies 34, 36 may convey an additive material, such as lime, cement, fly ash, calcium oxide, or any combination thereof, which has been stored in additive tank 14, through additive outlets 42, 44 and into solidification chamber 16 where impellers 50, 52 mix the additive material with the drill cuttings exiting through cuttings outlet 48. The mixture may then exit solidification chamber 16 through the port at its base, and enter discharge conduit 80, where the discharge auger may transfer the mixture to discharge outlet 86 and into a waste receptacle, with the discharge auger further mixing the drill cuttings and additive material along the way. Additive tank 14 may be charged with an additive material before or after arrival at the drilling location. Additive tank 14 may include a cover. For example, the cover of additive tank 14 may be formed of a rolling tarp or any other device or mechanism capable of preventing water from entering additive tank 14.

Upon completion of use, solidification system 10 may be quickly prepared for transportation away from the drilling location. Specifically, hydraulic arms 88, 90 may be deactivated in order to lower discharge conduit 80. Slew gear 82 may be used to rotate discharge conduit 80 into its retracted position within the recesses of gussets 60, 62, and 64. The power cord may be disconnected and portable unit 20 may be connected to a truck or tractor for transportation.

Solidification system 10 has a smaller footprint than conventional devices used for separation and solidification of drill cuttings. Solidification system 10 requires minimal rig up time and minimal operational personnel. Additionally, dryers 70, 72, and 74 achieve high separation efficiency.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

The invention claimed is:

1. A drill cuttings solidification system comprising:
    a cuttings tank for storage of a drill cuttings material, the cuttings tank comprising a cuttings auger assembly for conveyance of the drill cuttings material to a cuttings outlet, the cuttings auger assembly disposed within a cuttings auger trough at a base of the cuttings tank;
    an additive tank for storage of a solidification material, wherein the additive tank is operatively connected to the cuttings tank and the cuttings auger assembly extends through a tunnel in the additive tank, the additive tank and the cuttings tank both operatively connected to a portable unit, wherein the additive tank comprises an additive auger assembly for conveyance of the solidification material to an additive outlet, the additive auger assembly disposed within an additive auger trough at a base of the additive tank;
    a solidification chamber comprising a housing enclosing the cuttings outlet and the additive outlet, and an impeller disposed within the housing for mixing the drill cuttings material from the cuttings outlet and the solidification material from the additive outlet.

2. The drill cuttings solidification system of claim 1, wherein the cuttings tank further comprises a bottom surface sloping toward the cuttings auger trough in the base of the cuttings tank.

3. The drill cuttings solidification system of claim 1, wherein the additive tank further comprises a bottom surface sloping toward the additive auger trough in the base of the additive tank.

4. The drill cuttings solidification system of claim 1, wherein the additive tank further comprises a second additive auger assembly for conveyance of the solidification material to a second additive outlet, the second additive auger assembly disposed within a second additive auger trough at the base of the additive tank.

5. The drill cuttings solidification system of claim 4, wherein the additive tank further comprises a bottom surface sloping toward the additive auger trough and the second additive auger trough in the base of the additive tank.

6. The drill cuttings solidification system of claim 4, wherein the solidification chamber further comprises a second impeller, wherein the impeller is disposed at the additive outlet and the second impeller is disposed at the second additive outlet within the solidification chamber.

7. The drill cuttings solidification system of claim 1, further comprising a discharge assembly extending from the solidification chamber to a discharge outlet, wherein the discharge assembly is configured to rotate and vertically pivot a discharge conduit relative to the portable unit.

8. The drill cuttings solidification system of claim 7, further comprising a series of gussets and beams for supporting the cuttings tank and the additive tank, wherein each of the gussets comprises a recess dimensioned to receive the discharge conduit of the discharge assembly in a retracted position.

9. The drill cuttings solidification system of claim 1, further comprising a dryer having a dry outlet in communication with the cuttings tank.

10. The drill cuttings solidification system of claim 9, further comprising a retractable slide in communication with an inlet of the dryer.

11. The drill cuttings solidification system of claim 1, further comprising two or more dryers, each dryer having a dry outlet in communication with the cuttings tank.

12. A drill cuttings solidification system comprising:
a cuttings tank for storage of a drill cuttings material, the cuttings tank comprising a cuttings auger assembly for conveyance of the drill cuttings material to a cuttings outlet, the cuttings auger assembly disposed within a cuttings auger trough at a base of the cuttings tank;
an additive tank for storage of a solidification material, wherein the additive tank is operatively connected to the cuttings tank and the cuttings auger assembly extends through a tunnel in the additive tank, the additive tank and the cuttings tank both operatively connected to a portable unit, wherein the additive tank comprises an additive auger assembly for conveyance of the solidification material to an additive outlet, the additive auger assembly disposed within an additive auger trough at a base of the additive tank;
a solidification chamber comprising a housing enclosing the cuttings outlet and the additive outlet, and an impeller disposed within the housing for mixing the drill cuttings material from the cuttings outlet and the solidification material from the additive outlet;
a discharge assembly extending from the solidification chamber to a discharge outlet, the discharge assembly comprising a discharge auger assembly disposed within a discharge conduit, a rotation mechanism for rotating the discharge conduit relative to the portable unit, and a pivot assembly for vertically pivoting the discharge conduit relative to the portable unit.

13. The drill cuttings solidification system of claim 12, wherein the rotation mechanism comprises a slew drive operatively connected to the solidification chamber; and wherein the pivot assembly comprises an inner shell operatively connected to the slew drive, an outer shell slidingly connected to the inner shell and operatively connected to the discharge conduit, and a hydraulic arm operatively connected to the discharge conduit, the hydraulic arm configured to vertically pivot the discharge conduit when activated.

14. The drill cuttings solidification system of claim 13, wherein the pivot assembly further comprises a second hydraulic arm operatively connected to the discharge conduit, the hydraulic arm and the second hydraulic arm configured to vertically pivot the discharge conduit when activated.

15. The drill cuttings solidification system of claim 12, wherein the rotation mechanism comprises a slew drive operatively connected to the portable unit; and wherein the pivot assembly comprises a hinged flange operatively connected to the solidification chamber and the discharge conduit, the pivot assembly further comprising a hydraulic arm operatively connected to the slew drive and the discharge conduit, the hydraulic arm configured to vertically pivot the discharge conduit when activated.

16. The drill cuttings solidification system of claim 15, wherein the pivot assembly further comprises a second hydraulic arm operatively connected to the slew drive and the discharge conduit, the hydraulic arm and the second hydraulic arm configured to vertically pivot the discharge conduit when activated.

17. A method of treating a drill cuttings material, comprising the steps of:
a) providing a drill cuttings solidification system comprising: a cuttings tank comprising a cuttings auger assembly disposed within a cuttings auger trough at a base of the cuttings tank, the cuttings auger assembly leading to a cuttings outlet; an additive tank operatively connected to the cuttings tank with the cuttings auger assembly extending through a tunnel in the additive tank, the additive tank and the cuttings tank both operatively connected to a portable unit, wherein the additive tank comprises an additive auger assembly disposed within an additive auger trough at a base of the additive tank, the additive auger assembly leading to an additive outlet; and a solidification chamber comprising an impeller and a housing enclosing the cuttings outlet, the additive outlet, and the impeller;
b) feeding a drill cuttings material into the cuttings tank;
c) using the cuttings auger assembly to transfer the drill cuttings material in the cuttings tank through the cuttings outlet and into the solidification chamber, and using the additive auger assembly to transfer an solidification material in the additive tank through the additive outlet and into the solidification chamber;
d) using the impeller to mix the drill cuttings material and the solidification material in the solidification chamber to form a cuttings solidification mixture.

18. The method of claim 17, wherein the drill cuttings solidification system further comprises a discharge assembly extending from the solidification chamber to a discharge outlet, the discharge assembly configured to rotate and vertically pivot a discharge conduit relative to the portable unit, the discharge conduit housing a discharge auger assembly, the method further comprising the steps of:
e) transferring the cuttings solidification mixture from the solidification chamber into the discharge conduit;
f) using the discharge auger assembly to transfer the cuttings solidification mixture to the discharge outlet.

19. The method of claim 17, wherein the drill cuttings solidification system further comprises a discharge assembly extending from the solidification chamber to a discharge outlet, the discharge assembly comprising a discharge conduit, a rotation mechanism, and a pivot assembly, the method further comprising the steps of:
- a1) transporting the drill cuttings solidification system with the discharge conduit in a retracted position, in which the discharge conduit is housed within a recess in each of a series of gussets operatively connected to the portable unit;
- a2) using the rotation mechanism of the discharge assembly to rotate the discharge conduit out of the recess in each of the series of gussets;
- a3) using the pivot assembly and the rotation mechanism of the discharge assembly to vertically pivot and rotate the discharge conduit in order to position the discharge outlet over a collection vessel.

\* \* \* \* \*